US010199936B2

(12) United States Patent
Luerkens et al.

(10) Patent No.: US 10,199,936 B2
(45) Date of Patent: Feb. 5, 2019

(54) DC TO DC CONVERTER (71) Applicant: KONINKLIJKE PHILIPS N.V., Eindhoven (NL)

(72) Inventors: Peter Luerkens, Aachen (DE); Albert Garcia Tormo, Eindhoven (NL); Bernd Ackermann, Aachen (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 15/574,597

(22) PCT Filed: May 17, 2016

(86) PCT No.: PCT/EP2016/060976
§ 371 (c)(1),
(2) Date: Nov. 16, 2017

(87) PCT Pub. No.: WO2016/188794
PCT Pub. Date: Dec. 1, 2016

(65) Prior Publication Data
US 2018/0166973 A1 Jun. 14, 2018

(30) Foreign Application Priority Data
May 27, 2015 (EP) ..................................... 15169406

(51) Int. Cl.
*H02M 3/156* (2006.01)
*H02M 1/34* (2007.01)
(Continued)

(52) U.S. Cl.
CPC ............. *H02M 3/156* (2013.01); *H02M 1/34* (2013.01); *H02M 3/33561* (2013.01);
(Continued)

(58) Field of Classification Search
CPC ...... H02M 3/156; H02M 3/155; H02M 3/145; H02M 3/158; H02M 2001/0067; H02M 2001/0077; H02M 2001/008; G05F 1/577
(Continued)

(56) References Cited

U.S. PATENT DOCUMENTS 5,508,903 A  4/1996 Alexandrov
5,847,949 A  12/1998 Jiang
(Continued)

FOREIGN PATENT DOCUMENTS

JP  2002233151 A  8/2008
WO  2006051450 A2  5/2006

OTHER PUBLICATIONS

Tsai, Cheng-Tao et al "Interleaved Soft-Switching Buck Converter with Coupled Inductors", WSEAS Transactions on Circuits and Systems, Issue 3, vol. 10, Mar. 2011.
(Continued)

*Primary Examiner* — Nguyen Tran
(74) *Attorney, Agent, or Firm* — Larry Liberchuk (57) ABSTRACT Pre-conditioners (or line-conditioners) are used to convert electrical power having first characteristics into electrical power having second characteristics. For example, a pre-conditioner may connect electrical equipment forming a load, which requiring only a conventional mains supply level to a utility three-phase supply. This means that the power components of the load may be de-rated, making the load electrical equipment cheaper. Such circuits may be further improved. Components in the down-converter itself still need to be rated to interface with the higher voltage. An approach is proposed in which two interleaved down-converters (36, 38) can be used to supply voltages. An energy
(Continued)

recovery element (50) connects snubbers of the interleaved down-converters, thus enabling some de-rating of the pre-conditioner circuitry.

10 Claims, 7 Drawing Sheets

(51) Int. Cl.
 H02M 3/335 (2006.01)
 H02M 3/158 (2006.01)
(52) U.S. Cl.
 CPC .................. H02M 2001/344 (2013.01); H02M 2001/346 (2013.01); H02M 2003/1586 (2013.01); Y02B 70/1491 (2013.01)
(58) Field of Classification Search
 USPC .................................. 323/222, 267
 See application file for complete search history.

(56) References Cited

U.S. PATENT DOCUMENTS

| 5,914,588 | A | * | 6/1999 | Jiang | .................. | H02M 1/4208 323/267 |
|---|---|---|---|---|---|---|
| 2008/0094866 | A1 | | 4/2008 | Bauman | | |
| 2009/0066311 | A1 | | 3/2009 | Luerkens | | |
| 2013/0114317 | A1 | | 5/2013 | Schlapbach | | |
| 2013/0235631 | A1 | | 9/2013 | Pahlevaninezhad | | |
| 2014/0160815 | A1 | | 6/2014 | Jeong | | |

OTHER PUBLICATIONS

Wilkinson, Richardt H. "Natural Balancing of Multicell Converters", Dissertation presented for the degree of Doctor of Philosophy in Engineering at the University of Stellenbosch, Apr. 2004.

Shrud, Mohamed A. et al "Modeling and Simulation of a Two Cell Automotive Interleaved Buck Converter", Sep. 2009.

Lakshmi, D. et al "Improved Step down Conversion in Interleaved Buck Converter and Low Switching Losses", Research Inventy: International Journal of Engineering and Science, vol. 4, Issue 3(Mar. 2014), pp. 15-24.

Harika, P. et al "Design and Simulation of Multi Cell Interleaved Fly Back Converter", IJREAT International Journal of Research in Engineering & Advanced Technology, vol. 2, Issue 6, Dec.-Jan. 2015.

Chen, Yaow-Ming et al "Interleaved Buck Converters with a Single-Capacitor Turn-Off Snubber", IEEE Transactions on Aerospace and Electronic Systems vol. 40, No. 3 Jul. 2004.

Tsai, Cheng-Tao et al "A High Step-Down Interleaved Buck Converter with Active-Clamp Circuits for Wind Turbin", Energies 2012, vol. 5, pp. 5150-5170.

Singh, Alok et al "On the Development of High Power DC-DC Step-Down Converter with Energy Recovery Snubber", Hindawi Publishing Corporation, Advances in Power Electronics, 2012, Article ID 806738, 10 pages.

Shin, H.B. et al "Generalized Steady-state Analysis of Multiphase Interleaved Boost Converter with Coupled Inductors", IEE Proc.-Electr. Power Appl., vol. 152, No. 3, May 2005.

* cited by examiner

DC TO DC CONVERTER

CROSS-REFERENCE TO PRIOR APPLICATIONS

This application is the U.S. National Phase application under 35 U.S.C. § 371 of International Application No. PCT/EP2016/060976, filed on May 17 2016, which claims the benefit of European Patent Application No. 15169406.4, filed on May 27 2015. These applications are hereby incorporated by reference herein.

FIELD OF THE INVENTION

The present invention relates to pre-conditioner circuit, an X-ray imaging system, and a lighting system.

BACKGROUND OF THE INVENTION

A power supply, or pre-conditioner circuit, is a device for the conversion of electrical power having one set of characteristics into electrical power having another set of characteristics, to meet specified requirements.

Often, power supplies, or pre-conditioner circuits, must be used with three-phase utility networks. Such networks provide a typical supply voltage of approximately 400 V between phases, and considering all possible voltage variations, the rectified voltage supplied to the input of a pre-conditioner circuit (sometimes referred to as a line conditioner) may range between 400 and 750 $V_{DC}$. As a result, the power components of the subsequent application should be designed to withstand the maximum voltage in this range. The purpose of a pre-conditioner is thus to generate a modified output voltage, for use driving a load of a main application. However, even though the components of the main application may be de-rated to reflect the lower voltage subsequent to the pre-conditioner, the components of the pre-conditioner itself must still be designed to operate at three-phase voltages.

WO 2006/051450 discusses a pre-conditioner topology which enables the components of the pre-conditioner to be de-rated. Such systems can be further improved, however.

US 2009/0066311 A1 discloses a pre-conditioner circuit comprising first and second preconditioner modules, each having an input and an output, the outputs being coupled to respective load modules.

U.S. Pat. No. 5,847,949 A discloses a boost converter for converting an input voltage received at an input thereof into first and second output voltages provided at first and second outputs thereof, respectively, a method of power conversion and a power converter employing the boost converter or the method.

JP 2002233151 A discloses a switching power circuit wherein one-side ends of a first snubber capacitor and a second snubber capacitor are connected to a junction between a first primary coil and a first switching means, and to a junction between a second primary coil and a second switching means, respectively.

SUMMARY OF THE INVENTION

It would be advantageous to have an improved pre-conditioner circuit for providing DC-DC voltage conversion.

Towards this end, a first aspect of this invention provides a pre-conditioner circuit having input terminals for receiving an input voltage, wherein the pre-conditioner is configured to modify the input voltage for application to a load. The pre-conditioner circuit comprises a first and a second pre-conditioner module each having an input and an output for connection to respective first and second load modules. The output of the first pre-conditioner module is coupled in series with the input of the second pre-conditioner module, and the output of the second pre-conditioner module is coupled in series with the input of the first pre-conditioner module.

The first and second pre-conditioner modules comprise a first and second snubber circuit, respectively. The first and second snubber circuits are interconnected by an energy recovery element, to enable a regular discharge of the first and second snubber circuits. The discharge has a substantial DC content.

Advantageously, a pre-conditioner circuit according to the first aspect provides a pre-conditioner circuit enhanced with snubber circuits, allowing the operation of the pre-conditioner circuit in a hard switching mode, whilst reducing energy losses due to dissipation in the power switches. Furthermore, electromagnetic interference (EMI) levels radiated from the circuit are reduced. In addition, the components of the snubber of the pre-conditioner circuit may be subject to the same de-rating as the power switches.

According to a second aspect of the invention, an X-ray imaging system comprising a pre-conditioner circuit as described above is provided, wherein the load comprises an X-ray tube.

An X-ray system using the pre-conditioner circuit improves the electromagnetic interference performance of such systems. It is important to reduce EMI emissions in an environment where sensitive medical equipment is present. The power-handling components of the X-ray system may be de-rated, thus reducing component cost.

According to a third aspect of the invention, a lighting system comprising a pre-conditioner circuit as described previously is provided.

A lighting system using the pre-conditioner circuit improves the EMI performance of such a lighting system, whilst using power-handling components which are de-rated, thus reducing component cost.

The term "load module" in this application refers to an application, or applications, which are connected to a pre-conditioner. The load may be resistive, reactive, or a mixture of the two. Example load modules may refer to X-ray tubes, or lighting ballast components. These uses of the invention are only exemplary, however, and the pre-conditioner circuit may be used in a wide range of applications, such as in CT scanners, C-arm imagers, MRI scanners, luggage X-ray scanners, conventional digital C-ray scanners. Many other applications will occur to the skilled person.

The term "snubber circuit" refers to a circuit used to suppress voltage and current transients in electrical systems which experience an abrupt interruption of a high-current path. When an inductive element is present, a sudden break in the current flow causes the magnetic field to collapse around the inductor in a very short time. The energy, previously stored in the magnetic field around the inductor, appears as a potential difference across the terminals of the inductor. A high instantaneous voltage is, therefore, induced across the terminals of the current switching device causing the transient. As well as being a source of electromagnetic interference, the transient so generated may even destroy the switching component. At the very least, with no other arrangements, it would be necessary to up-rate the reverse-voltage tolerance of the switching component, leading to extra equipment cost.

A simple snubber circuit typically consists of a network having a snubber capacitor, a reverse-biased snubber diode, and a snubber resistor in parallel with power switching devices. This network reduces the voltage slope across the device, causing a reduction in electromagnetic interference. The energy, which would normally be dissipated in the power switching device, is, instead, absorbed by the snubber capacitor. In order to repeat the process once more at a subsequent switching event, the snubber capacitor has to be discharged by the snubber resistor. Thus, power is dissipated in the snubber resistor, rather than in the power switching devices.

In the following application, the term "energy recovery element" refers to a circuit component which can store electrical energy at one point, and discharge electrical energy at another point. In particular, an example of an energy recovery element is an inductor.

Seen another way, an approach of the invention can be seen as providing a pre-conditioner circuit topology using two interleaved converter cells, where the electrical stress on the individual components of the converter cells is reduced by taking advantage of components from one cell of the topology to recover energy from a snubber in another cell of the topology. This is possible because the snubbers of the interleaved converter cells are interconnected with an energy recovery element, such as an inductor. In this topology one of the snubbers has always higher voltage than the other one, a (loss-less) element is used to use the extra charge of a second snubber to discharge the first snubber.

Each converter cell is provided with a snubber circuit in which an energy recovery element connects the snubber circuits of the two corresponding interleaved buck converter cells. The current flowing through the energy recovery element automatically adjusts to the current switching scheme of the converter, so that the discharge of the snubber capacitors is exactly achieved by the moment that a subsequent switching event occurs.

These, and other aspects of the invention, will become apparent from, and are elucidated with reference to the embodiments described hereinafter.

BRIEF DESCRIPTION OF THE DRAWINGS

Exemplary embodiments of the invention will be described with reference to the following drawings.

DETAILED DESCRIPTION OF EMBODIMENTS

A pre-conditioner is typically fitted to connect a three-phase utility power supply, and a final load application. The pre-conditioner (or line conditioner) regulates or limits the input voltage to a reasonable range at its output. This means that components in the final application (load) may be de-rated, with respect to the initial three-phase line voltage.

Figure 1:
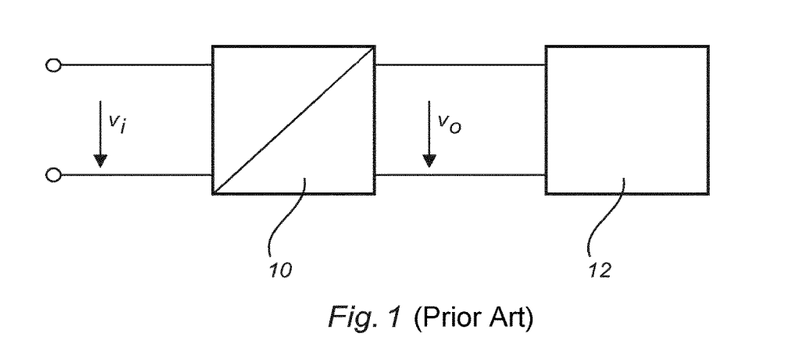
FIG. 1 shows a pre-conditioner circuit concept.

FIG. 1 shows a conventional pre-conditioner circuit 10 connected to a load 12. The input voltage $V_i$ is supplied from a conventional rectification and smoothing arrangement, such as a bridge rectifier with a smoothing capacitor. The pre-conditioner circuit 10 conditions the input voltage $V_i$ into a voltage $V_o$, which is then applied to the load 12. Because the pre-conditioner circuit is connected to the three-phase mains input, components of the pre-conditioner circuit must be rated appropriately for use with voltages up to the maximum voltage present at $V_i$.

Components used in the load 12 only need to be rated to ensure that they can operate with the maximum voltage output (and a safety margin) of the pre-conditioner 10.

Figure 2:
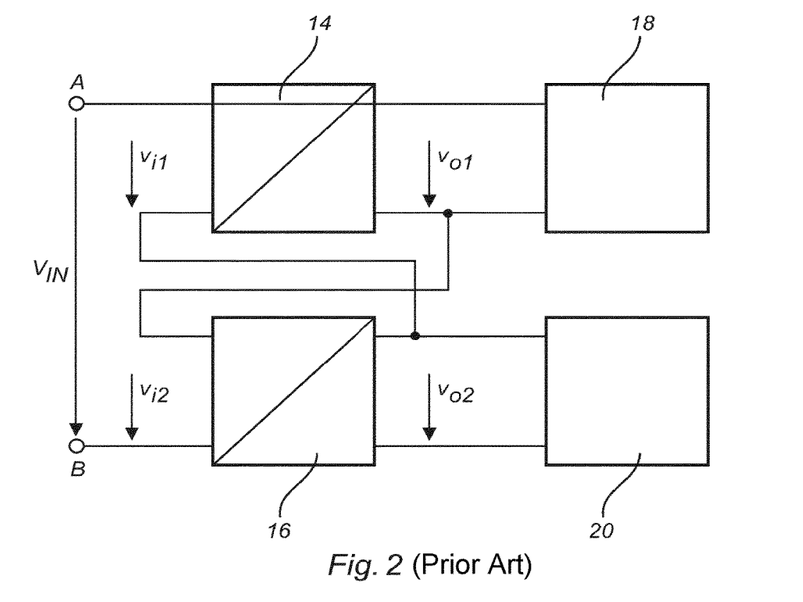
FIG. 2 shows a prior art pre-conditioner circuit system diagram.

FIG. 2 illustrates a type of pre-conditioner circuit further described in WO 2006/051450. This pre-conditioner has two down-converters arranged in an interleaved arrangement. The DC supply input denoted by $V_{in}$ is applied across first and second pre-conditioner modules 14 and 16, each having respective input terminals denoted by $V_{i1}$ and $V_{i2}$, respectively.

The output terminals of the pre-conditioner modules 14 and 16 are connected to first and second respective loads (main applications) 18 and 20. As shown, an output $V_{o1}$ of the first pre-conditioner module 14 is connected in series with the input of the second pre-conditioner module 16. An output $V_{o2}$ of the second pre-conditioner module 16 is connected in series with the input of the first pre-conditioner module 14. The first pre-conditioner module 14 produces an output whose upper voltage rail has the same electrical potential as the upper voltage rail A of the input voltage, while the second pre-conditioner module 16 produces an output whose lower voltage rail has the same electrical potential as the lower voltage rail B of the input voltage. Therefore, the maximum input voltage range that each of the pre-conditioner modules 14 and 16 experience is reduced, relative to the supply input $V_{in}$.

In some practical implementations, each pre-conditioner module 14, and 16, comprise down-converters, for example buck converters. Therefore, by control, it is possible to reduce $V_{o1}$ and $V_{o2}$ of the pre-conditioner modules (down-converters) if the respective $V_o$ is not less than $V_{in}/2$.

Figure 3:
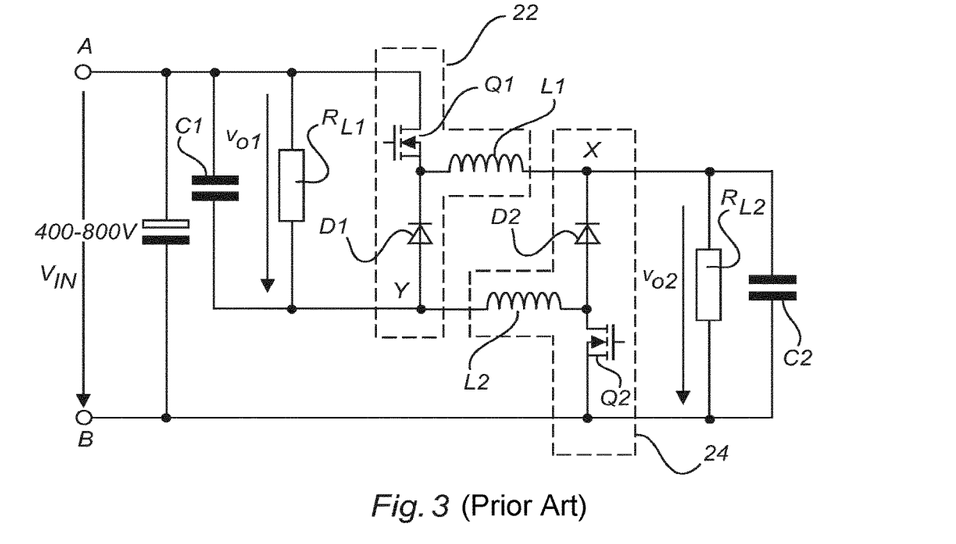
FIG. 3 shows an example schematic diagram for a prior art pre-conditioner circuit.

Turning to FIG. 3, a practical example of this interleaved architecture is illustrated. In this example, the outputs of the pre-conditioner modules 14 and 16 are connected to loads 18 and 20. The loads are, in this example, considered to be simple resistors $R_{L1}$ and $R_{L2}$. The pre-conditioner modules 14 and 16 contain the elements of a single quadrant DC/DC converter, which might be understood as step-down-converter (buck-converter), or, depending on the selection of reference node, also as step-up converter (boost-converter), e.g. with inverted polarity. In this description, the converter cells are considered as down-converters. Dotted line box 22 and dotted line box 24 illustrate circuits corresponding to the pre-conditioner circuits 14 and 16, respectively. The basic components of a down-converter (and also boost-converter) consist of an inductor, a transistor (operating as a switch) and a diode. In FIG. 3, a pre-conditioner module comprises a capacitor $C_1$ in parallel with a resistor $R_{L1}$. The switch is an n-channel IGFET (Insulated Gate Field Effect Transistor) $Q_1$, for example, although other power switching devices could be used. Diode $D_1$ is reverse-biased with respect to the source of the IGFET $Q_1$. Alternatively, the diode may be substituted by a further controlled switch. The input voltage $V_{in}$ may range between 400 and 800 Volts.

Similarly, a pre-conditioner circuit comprises capacitor $C_2$, resistor $R_{L2}$, switch $Q_2$, and diode $D_2$. A first input voltage appears across nodes A and X, and a second input voltage appears across nodes Y and B. The voltage $V_{o1}$ appears across load $R_{L1}$, and the voltage $V_{o1}$ appears across load $R_{L2}$.

Although not shown, a control circuit is provided to control switching of the power transistors $Q_1$ and $Q_2$. Control of the pre-conditioner modules is realized by varying the duty-cycle of the power transistors $Q_1$ and $Q_2$. The functioning of this type of circuit is further described in WO 2006/051450.

In essence, in a case where the switches (power transistors) $Q_1$ and $Q_2$ are both turned off, the supply current flows firstly through load resistor $R_{L1}$. Then, at node Y, it separates into two branches, one flowing through diode $D_1$ and inductor $L_1$, and the other through inductor $L_2$ and diode $D_2$. The current branches are combined at node X, and the current then flows through load resistor $R_{L2}$ to ground. This means that in this case, the load modules are connected in series, causing each load module to accept half of the input voltage $V_{in}$.

It may also be considered that the two power transistors are switched on continuously. In this case, the load resistor $R_{L1}$ is connected to ground over inductor $L_2$ and transistor $Q_2$. The load resistor $R_{L2}$ is connected to the supply voltage by inductor $L_1$ and switch $Q_1$. The inductors $L_1$ and $L_2$ do not incur any voltage drop, averaged over time. Thus, the two load resistors can, effectively, be considered to be connected in parallel, meaning that each load module $R_{L1}$, $R_{L2}$ accepts the full input voltage.

Adjustment of the duty cycle of the two power switching transistors $Q_1$, $Q_2$ means that an adjustable supply voltage $V_{o1}$, $V_{o2}$ of the load modules between 50% and 100% of the input voltage $V_{in}$ can be achieved.

Hard-switching (in which the switch-off gradient of the switching transistors $Q_1$ and $Q_2$ occurs in a very short time) can cause problems through the emission of electromagnetic interference, and power dissipation in the power switching transistors $Q_1$ and $Q_2$.

When the power switching transistor $Q_1$ is turned off suddenly, there will be a sudden change of the current in the loops consisting of $Q_1$, $D_1$, and $C_1$. When the power switching transistor $Q_2$ is switched off, there will, likewise, be a sudden change of the current in the loop consisting of $Q_2$, $D_2$, and $C_2$. These loops have an inherent parasitic inductance, which, left unchecked, would cause a sharp voltage rise during switch-off events. Eventually, a very high voltage would appear across the power switching transistors $Q_1$ or $Q_2$ respectively.

This is undesirable, firstly because such rapid transients generate electromagnetic interference, which is undesirable in a medical environment, or more generally.

A second problem is that the high voltages so induced at the transistor terminals mean that up-rated power transistors must be used, leading to an increased component cost.

Efforts to constrain the generation of such high power transients in continuous conduction modes of DC-DC converters are often restricted to the application of complicated topologies, such as "auxiliary resonant commutation pole converters" (ARCP). This topology doubles the effort on the power switching devices, control, and passive components.

Thus, a way to simplify such means, as applied to interleaved pre-conditioner circuits, would be desirable. A suitable means for controlling the turn-off behavior is a snubber circuit.

A snubber circuit consists typically of a series network of a capacitor and a diode. The series network is connected in parallel across the source and drain of a power switching transistor. A resistor is provided in parallel with the terminals of the diode. Such a network reduces the voltage slope across the power switch during transient switching events, leading to a reduction in EMI radiation. This arrangement is referred to as a passive snubber. The resistor discharges the snubber capacitor while the power switching transistor is turned on, whilst accepting the energy in the snubber capacitor being lost. A lossless alternative to a resistor is to employ a small extra power converter to discharge the capacitors. This is referred to as an active snubber.

Figure 4:
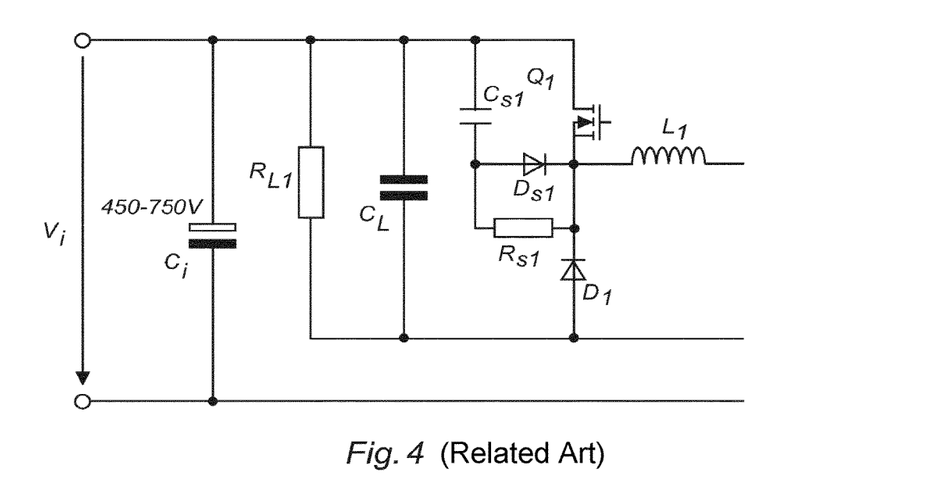
FIG. 4 shows a cell of an interleaved down-converter with a conventional snubber circuit arrangement.

FIG. 4 shows one cell of a typical interleaved down-converter with a standard passive snubber circuit fitted. A voltage, $V_i$, is applied across the input terminals from a bridge rectifier, for example. An input smoothing capacitor $C_i$ smoothes the input voltage to a DC value. Typically, $C_i$ is exposed to a voltage range of 450 to 750 V. The components of a normal interleaved down-converter cell are present (as shown in FIG. 3). Thus, the power switching transistor $Q_1$ has a drain connected to the input terminal $V_i$ and a source terminal connected to the diode $D_1$. Also connected to the source terminal of $Q_1$ is the down-converter inductor $L_1$. The load $R_{L1}$ and down-converter capacitor $C_L$ are connected in parallel across the upper input voltage rail and the cathode of $D_1$.

What is also shown in FIG. 4 is a standard passive snubber circuit fitted to the down-converter components. The snubber comprises a first snubber capacitor $C_{s1}$ connected on one side to the upper input voltage rail and connected on its other side to the cathode of a first snubber diode $D_{s1}$. The cathode of the first snubber diode $D_{s1}$ is connected to the source of the power switching transistor $Q_1$. A first snubber resistor $R_{s1}$ is connected in parallel across the anode and cathode of $D_{s1}$.

Thus, FIG. 4 shows a pre-conditioner cell comprising a down-converter, with additional passive snubber circuitry, configured to reduce switching stress when turning off high currents. As is known to the person skilled in the art, the abrupt switch-off of power transistor $Q_1$ causes the energy stored in a magnetic field in the loop comprising $Q_1$, $D_1$ and $C_1$ to be induced as a voltage across $Q_1$ as the magnetic field collapses. If the transient time of the switching of $Q_1$ is very short, the voltage induced at $Q_1$ will be significant. Such fast switching causes radiated electromagnetic emissions (EMI emissions), which are a critical problem occurring as a side effect. EMI emissions cause standardization problems, especially in sensitive equipment such as medical X-ray machines. In addition, the large voltage transient caused by the collapse of the field in the loop comprising $Q_1$, $D_1$ and $C_i$ means that an up-rated power switching transistor $Q_1$ and diode $D_1$ is required.

The passive snubber circuit shown in FIG. 4 addresses this by reducing the voltage slope across the power switching transistor. The energy from the parasitic inductor of the switching loop, which would normally be dissipated in the power switching transistor $Q_1$, is absorbed in the first snubber capacitor $C_{s1}$. In order to allow this process to be repeated at a subsequent switching event, the first snubber capacitor $C_{s1}$ is discharged by a first snubber resistor $R_{s1}$. Because the first snubber resistor $R_{s1}$ is a resistive device, it dissipates the energy as the discharge occurs.

Although a passive snubber has been described, other snubber approaches engage a small extra power converter to discharge the capacitor, by transferring the energy back into the system power supply. This is known as an active, or regenerative, snubbing approach.

The large transients generated in the passive snubbing approach illustrated in FIG. 4 lead to a need to use relatively large capacitances, which raises the question of how to deal with the energy dissipated in the snubber resistor.

Figure 5:
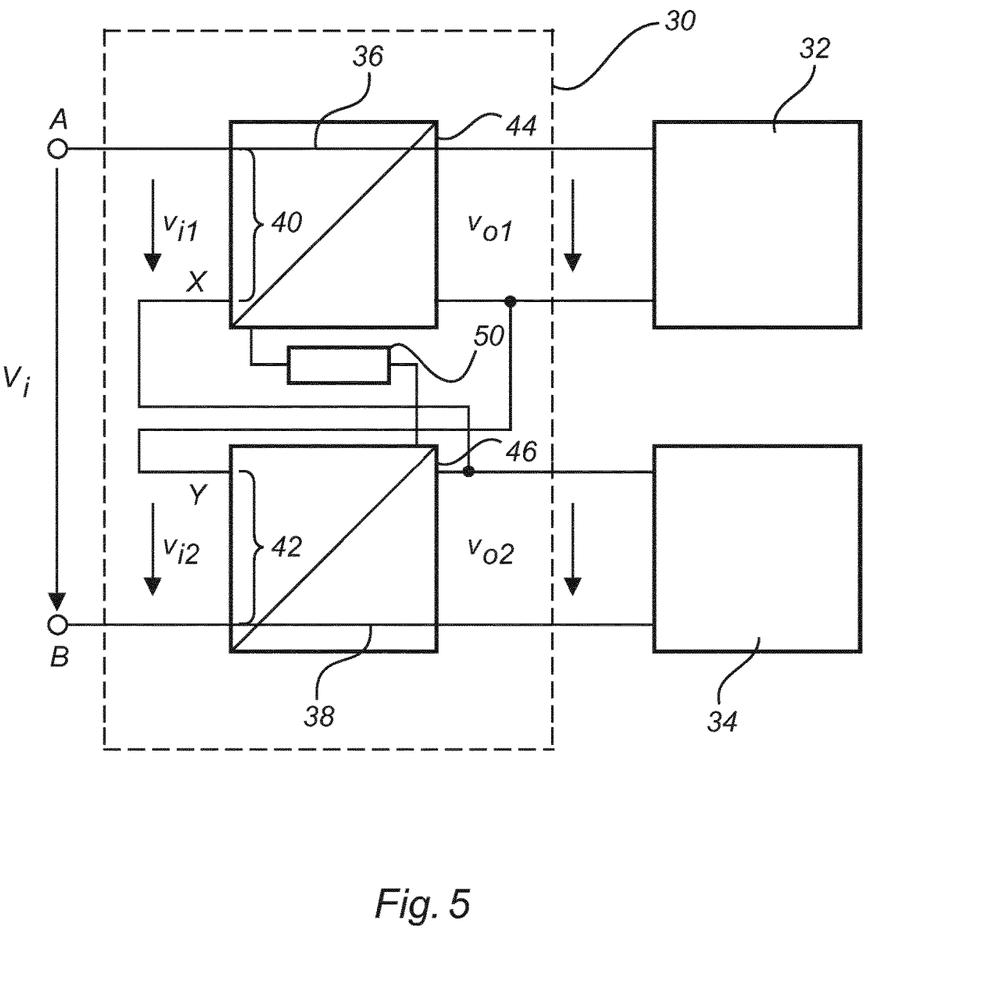
FIG. 5 shows a pre-conditioner circuit according to a first aspect of the invention.

FIG. 5 shows a pre-conditioner circuit 30 according to a first aspect of the invention. The pre-conditioner circuit 30 is provided having input terminals A, B for receiving an input voltage, wherein the pre-conditioner circuit is configured to modify the input voltage for application to a load. The pre-conditioner circuit 30 comprises a first 36 and a second 38 pre-conditioner module each having an input 40, 42 and an output 44, 46 for connection to respective first 32 and second 34 load modules. The output of the first pre-conditioner module 36 is coupled in series with the input of the second pre-conditioner module 38, and the output of the second pre-conditioner module 38 is coupled in series with the input of the first pre-conditioner module 36.

The first 36 and second 38 pre-conditioner modules comprise a first and a second snubber circuit, respectively (not shown in FIG. 5). The first and second snubber circuits are interconnected by an energy recovery element 50 to enable a regular discharge of the first and second snubber circuits.

Accordingly, a pre-conditioner circuit according to this first aspect of the invention is able to recover energy using the availability of a second interleaved down-converter stage. By connecting two snubber circuits of two interleaved down-converters using an energy recovery element 50, a stable current flow is created in the energy recovery element 50 that completely discharges the snubber capacitor during the turn-on period of a power switching transistor inside the first or second pre-conditioner module, in the continuous conduction mode.

Additionally, it is possible to control the voltage slope, and to mitigate EMI emissions.

FIG. 5 shows an example of a pre-conditioner circuit according to the previously described first aspect of the invention. In FIG. 5, a DC input voltage $V_i$ (for example from a bridge rectifier and smoothing capacitor) is applied across input terminals A and B. The pre-conditioner circuit is shown inside a dotted line box 30. The pre-conditioner circuit 30 comprises a first pre-conditioner module 36 and a second pre-conditioner module 38. The first pre-conditioner module 36 has a first input connection to node A of the input voltage supply. The second input of the first pre-conditioner module 36 at node X is connected to an output terminal 46 of the second pre-conditioner module 38. The output terminals of the first pre-conditioner module 36 are connected to the first load module 32. The output of the second pre-conditioner module 38 is connected across the second load 34.

Turning to the second pre-conditioner module 38, an input terminal of the second pre-conditioner module is connected to node B of the input voltage supply. Node Y of the input of the second pre-conditioner module 38 feeds back to a lower output of the first pre-conditioner module 36. Thus, the first pre-conditioner module 36 and the second pre-conditioner module 38 form interleaved pre-conditioner modules. Although not illustrated in the diagram, the first pre-conditioner module 36 and the second pre-conditioner module 38 comprise first and second snubber circuits, respectively. The first and second snubber circuits are interconnected by an energy recovery element 50.

The voltage appearing across terminals 40 of the first pre-conditioner module 36 is denoted by arrow $V_{i1}$. The voltage appearing across the input terminals denoted by bracket 42 of the second pre-conditioner module 38 is denoted by $V_{i2}$. The output voltage appearing at the output of the first pre-conditioner module 36 is denoted by arrow $V_{o1}$. The voltage appearing across the output terminals of the second pre-conditioner module 38 is denoted by the arrow $V_{o2}$.

Thus, the topology of the circuit can be understood as comprising two down-converters supplying two load blocks, where the output voltage of each down-converter is separated by a DC offset. The first pre-conditioner module 36 has an output rail connected to the positive supply voltage, with the second rail supplying a constant voltage which is in between the positive input voltage A and the negative input voltage (The positive input voltage is supplied at terminal A, and the negative input voltage is supplied at terminal B).

The second pre-conditioner module 38 has an output rail connected to the negative supply voltage at B, while the other input rail of the second pre-conditioner module 38 also produces a voltage in-between the positive and negative supply voltage. Thus, it will be seen from this general topology that the output of the first pre-conditioner module 36 feeds into the output of the second pre-conditioner module 38. In fact, the voltage of the lower rail of the first pre-conditioner module 36 is lower than the voltage of the upper of the second pre-conditioner module 38, resulting in two, overlapping, output voltage windows as applied to the first load 32 and the second load 34, respectively.

Hence, the ratio between the input voltage $V_i$ and the output voltages $V_{o1}$, and $V_{o2}$ is bound between 2 and 1. Alternatively, if the input voltage is two times the output voltage, the power transistors inside the first pre-conditioner module 36 and second pre-conditioner module 38 are never turned on. In this case, the first pre-conditioner module 36 and the second pre-conditioner module 38 are effectively connected in series using the output inductors of the pre-conditioner modules. If the input voltage is exactly the output voltage, then the power transistors of the first and second pre-conditioner modules are always on effectively connecting the first pre-conditioner module and the second pre-conditioner module in parallel to the input voltage $V_i$.

In all cases in-between, the power switching transistors of the first pre-conditioner module 36 and the second pre-conditioner module 38 are subject to pulse width modulated (PWM) switching, with a duty cycle calculated as (assuming a continuous conduction mode)

$$a = \frac{2V_o - V_i}{V_o} \qquad (1)$$

Therefore, a benefit of this topology is that none of the power semiconductors need to withstand a higher voltage than that which is associated with their output voltage block. Therefore, efficient fast-switching MOSFETs or IGBTs may be used, even through the circuit is supplied by rectified three-phase mains.

Figure 6:
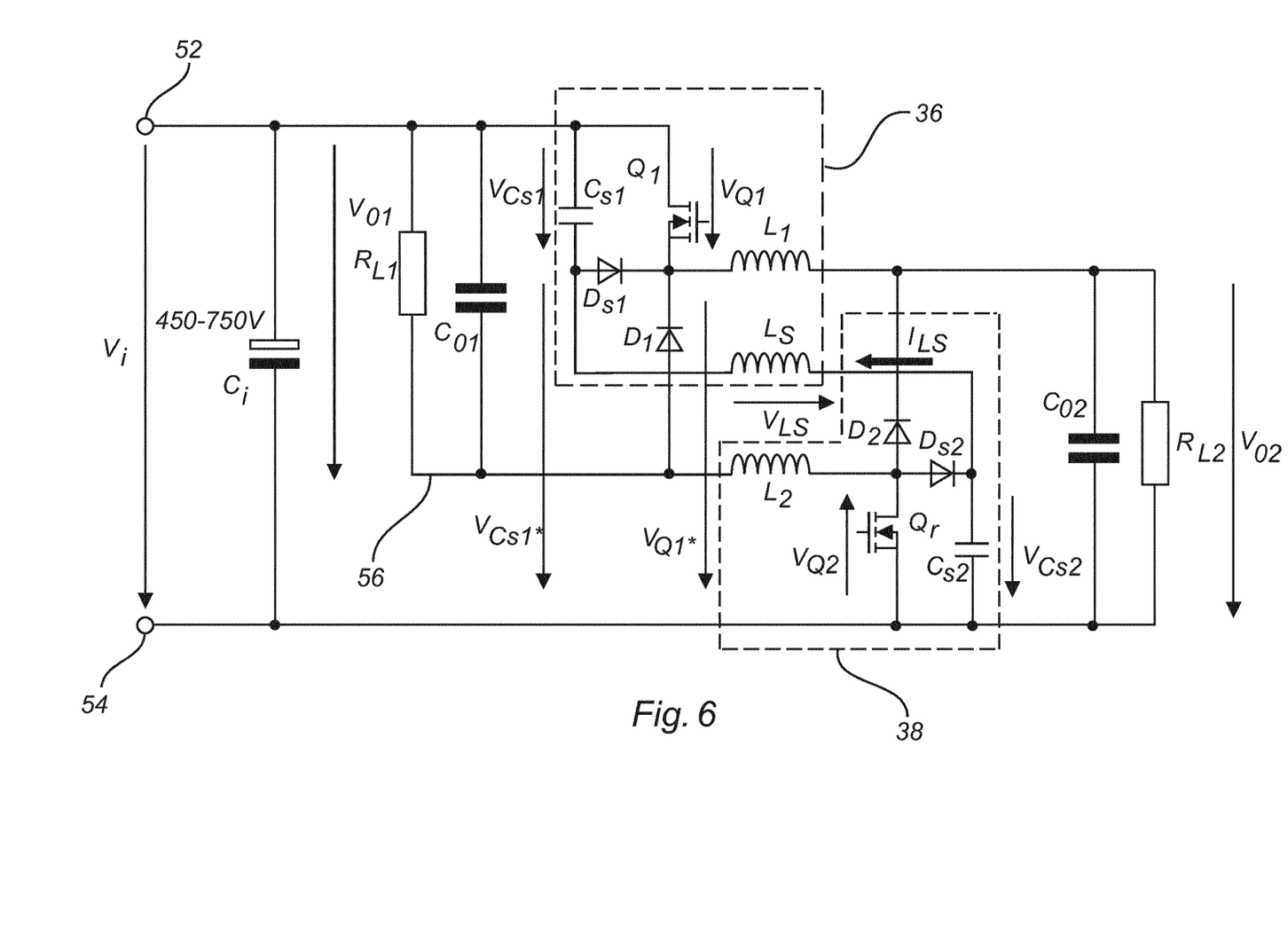
FIG. 6 shows a specific implementation of a pre-conditioner circuit according to a first aspect of the invention.

FIG. 6 shows a specific implementation of the topology described previously. In FIG. 6, the input voltage $V_i$ is applied across input terminals 52 and 54. An input capacitor $C_i$ smoothes the applied voltage. $C_i$ is typically rated between 450 to 750 V for a three-phase application. In FIG.

6, the dotted line box 36 illustrates a first pre-conditioner module, and the dotted line box 38 illustrates a second pre-conditioner module. Therefore, these brackets have the same reference numeral as the associated modules in FIG. 5. Therefore, FIG. 6 shows two down-converters in an interleaved topology.

The first pre-conditioner module 36 comprises a first power switching transistor $Q_1$, whose drain is connected to the voltage supply rail 52. The source terminal of power switching transistor $Q_1$ is connected to the cathode of a first diode $D_1$.

The gate terminal of the power switching transistor $Q_1$ is connected to a control circuit (not shown). It will be appreciated that the control circuit could be any circuit capable of driving the power switching transistor $Q_1$ in such a way as to provide down-conversion functionality. Typically, $Q_1$ is fed with a pulse width modulated (PWM) signal, generated by a microprocessor, or is instead driven by an analogue control loop.

The first pre-conditioner inductor $L_1$ is connected to the source of the power switching transistor $Q_1$. The anode of the first diode $D_1$ is connected to one side of the first pre-conditioner capacitor $C_{o1}$, which is in its turn also connected to the voltage supply rail 52. Therefore, the output capacitor $C_{o1}$ of the first pre-conditioner module 36 is connected in parallel across the drain terminal of the power switching transistor $Q_1$ and the anode of the diode $D_1$.

The first load module (corresponding to item 32 in FIG. 5) is represented here by the load resistor $R_{L1}$ connected in parallel across the output capacitor $C_{o1}$. In other words, the first load resistor is connected on one side at the upper voltage supply rail 52, and on its other side to an intermediate voltage rail 56. Together, these components form a basic down-converter.

Turning to particulars of the second pre-conditioner module 38, a second power switching transistor $Q_2$ is connected at its source to the lower voltage rail 54. The drain of power switching transistor $Q_2$ is connected to the anode of second diode $D_2$, and the cathode of diode $D_2$ is connected to the terminal of first inductor $L_1$ (the terminal of $L_1$ which is not connected to the first pre-conditioner module 36). The drain of the second power switching transistor $Q_2$ is connected to a second inductor $L_2$, and the other side of the inductor $L_2$ is connected to the anode of the first diode $D_1$, the load $R_{L1}$, and the capacitor $C_{o1}$.

Thus, the load $R_{L1}$, the capacitor $C_{o1}$, and the inductor $L_2$ are all connected to the node 56 which forms an intermediate voltage rail. The second pre-conditioner module 38 is connected to the resistance $R_{L2}$, which corresponds to the second load module 34 in FIG. 5, and the output capacitor of the second down-converter $C_{o2}$.

As described up to this point, it will be appreciated that a pre-conditioner circuit having a first 36 and a second 38 pre-conditioner module, wherein the first and second pre-conditioner modules are interleaved, is present. According to this first aspect of the invention, the first pre-conditioner module 36 is supplemented with a first snubber network.

The first snubber network comprises a first snubber capacitor $C_{s1}$ connected in series with the anode of a first snubber diode $D_{s1}$. The cathode of the first snubber diode $D_{s1}$ is connected to the source terminal of the first power switching transistor $Q_1$ (and the cathode of the first diode $D_1$) and the terminal of the first pre-conditioner inductor $L_1$. The other terminal of the first snubber capacitor $C_{s1}$ is connected to the voltage rail 52.

Turning to the second pre-conditioner module, a snubber network is provided comprising a second snubber capacitance $C_{s2}$ connected on one side to the lower voltage rail 54 and connected on its other side to the cathode of a second snubber diode $D_{s2}$. The anode of the second snubber diode $D_{s2}$ is connected to the drain of the second power switching transistor $Q_2$ and the cathode of the second diode $D_2$.

It will be appreciated that the standard dissipative element (a resistance) is not present in the first snubber circuit nor in the second snubber circuit. According to this first aspect of the invention, an energy recovery element 50 connects the first snubber circuit and the second snubber circuit.

In particular, the energy recovery element 50 is connected on one side to the node formed by the junction of the first snubber capacitance $C_{s1}$ with the anode of the first snubber diode $D_{s1}$, and the energy recovery element is connected on the other side to the node formed by the cathode of the second snubber diode $D_{s2}$ and the second snubber capacitor $Cs_2$. In FIG. 6, the energy recovery element 50 is provided as an inductance $L_S$.

The snubber energy recovery principle made possible with the circuit of FIG. 5, as detailed in the schematic of FIG. 6, will now be explained. The snubber capacitors $C_{s1}$ and $C_{s2}$ absorb the momentary current from the first power switching transistor $Q_1$ and the second power switching transistor $Q_2$, respectively, when those are turned off.

Figure 7:
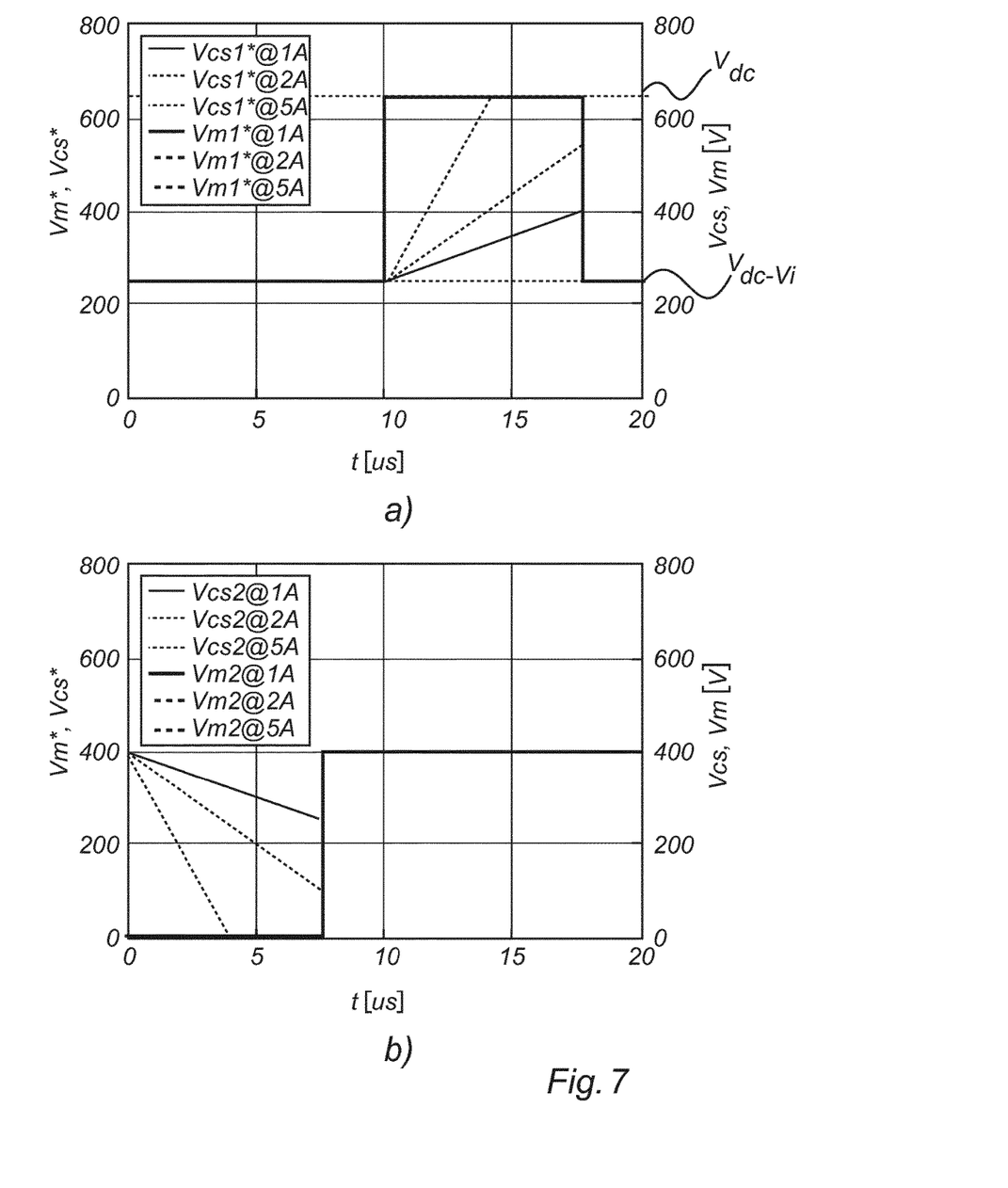
FIG. 7 shows voltage curves for a pre-conditioner circuit according to a first aspect of the invention.

The first snubber capacitor $C_{s1}$ and the second snubber capacitor $C_{s2}$ must be discharged during the time when their associated power switch $Q_1$ or $Q_2$ is turned on, so that on a subsequent switching cycle, the snubber capacitors are able to accept a subsequent pulse of turn-off current from the inductors $L_1$ or $L_2$. Turning briefly to FIG. 7, waveforms in the two pre-conditioner modules are shown. These waveforms have been calculated based on analytical solution of the differential equations of the circuit.

In FIG. 7a), the absolute voltage with respect to circuit ground is shown, plotted against the time in microseconds. This corresponds to the voltage at the first pre-conditioner module 36. The solid line shows the voltage at the switching node of the source of $Q_1$.

A situation of the first pre-conditioner module 36 is shown in FIG. 7a). With no current in the energy recovery element (inductor $L_S$), the voltage will be frozen at the value of the input voltage $V_i$, minus the output voltage of the pre-conditioner module 36.

This voltage is lower than the frozen voltage of the snubber of the second pre-conditioner module 38, because of the aforementioned overlapping voltage windows inherent in an interleaved down-converter topology. The consequence is that current is built up in the energy recovery element 50 (inductor $L_S$) in a direction from the second pre-conditioner module 38 towards the first pre-conditioner module 36 snubber circuit. This behavior is illustrated by the current arrow $I_{LS}$ in FIG. 6.

FIG. 7b) shows the switching behavior at the node represented by the drain terminal of power switching transistor $Q_2$. The voltage at the switching node of $Q_2$ relative to ground is shown on the x-axis, plotted against the time on the y-axis. Necessarily, the average voltages at the switching nodes have to be equal to the voltages at opposite ends of their associated main inductors. Hence, the average voltage at the node $Q_1/D_1$ (the source of power transistor $Q_1$) will be higher than the average voltage at the node $Q_2/D_2$ (the node represented by the anode of $D_2$ and the drain of power switching transistor $Q_2$).

Assuming an abrupt turn-off of the second power switching transistor $Q_2$ at the point t=7.5 μs, the current flowing from inductor $L_2$ flows through the second snubber diode into the second snubber capacitance $C_{s2}$, which will be charged until the voltage across $C_{s2}$ equals the output voltage of the second pre-conditioner module 38. At this point, the load current moves to $D_2$, and the second snubber diode $D_{s2}$ blocks the current.

FIG. 7b) shows the waveforms for various regenerative currents in the energy recovery element (inductor $L_S$). The higher the regenerative current is, the faster the slope which discharges the second (or first) snubber while the power transistor is turned on. Without any current in the inductor $L_S$, however, the voltage of the second (or first) snubber remains forever at the level of the output voltage.

FIG. 7 also shows the effect of a current in the energy recovery element 50 (inductor $L_S$) on the voltages at the nodes of the first and second snubber circuits. The voltage at the snubber of the first pre-conditioner module 36 is increased, while the voltage at the snubber of the second pre-conditioner module 38 decreases. Assuming infinite current in the inductor $L_S$, the voltage waveform at the first and second snubber nodes would become the same as the voltage of the switching nodes. However, the average voltage at the switching nodes is in the opposite direction to the average voltage of the snubber nodes without discharge current. It follows, that there must be one current at which the average voltage of the snubber nodes is equal, and thus the current in feedback inductor $L_S$ does not change anymore.

Figure 8:
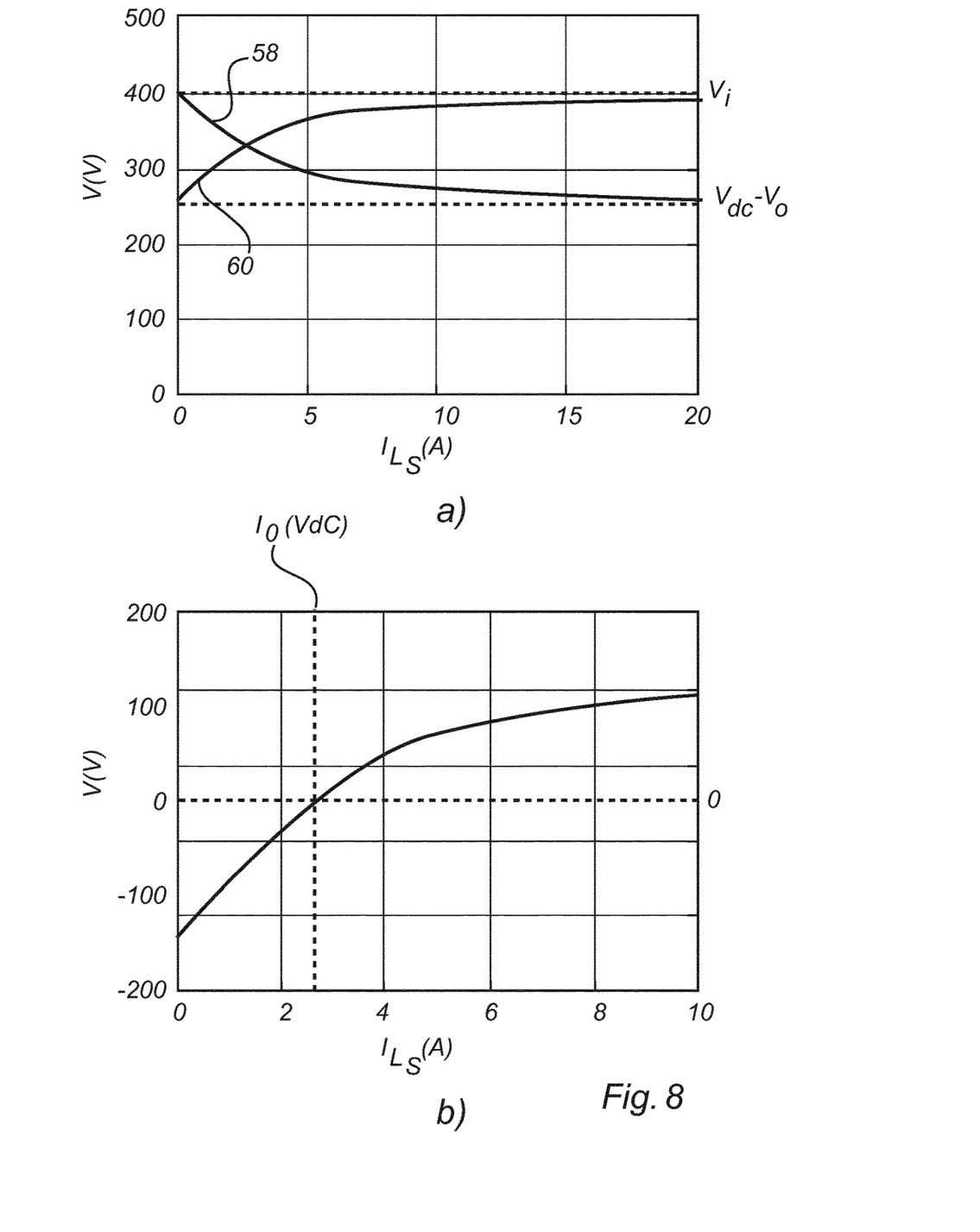
FIG. 8 shows voltage-current curves for a pre-conditioner circuit according to a first aspect of the invention.

Turning to FIG. 8, a calculation is shown of average voltages depicted over the actual value of the regenerative current in the energy recovery element 50 (feedback inductor $L_S$).

FIG. 8a) shows the line 60 representing the snubber node voltage in the first snubber (of the first pre-conditioner circuit 36). The line 58 illustrates the average snubber node voltage at the second snubber (the snubber of the second pre-conditioner circuit 38). These snubber node voltages are plotted against the current in the energy recovery element 50 (inductor $L_S$). In other words, the line 60 represents the voltage at arrow $V_{cs1}$ in FIG. 6. The line 58 represents the voltage at arrow $V_{cs2}$ in FIG. 6—these voltages are average voltages). Thus, as the current in the energy recovery element 50 (inductor $L_S$ ranges from 0 and to towards infinity) the node voltage at the first snubber node $V_{CS1}$ ranges from about 250 V to 400 V (the voltage $V_{out}$ in the calculation). Over the same range, the voltage at the second snubber node $V_{cs2}$ ranges from $V_{out}$ (400 V) towards the intermediate rail voltage 56 ($V_{DC}-V_{out}$).

Turning to FIG. 8b) a plot is shown of the average voltage $V_{LS}$ across the energy recovery element 50 (feedback inductor $L_S$) and plotted against the regenerative current in $L_S$ ($I_{LS}$). It is seen that there will always be a current leading to a stable state.

To further aid understanding at the operation of the circuit, an expression deriving the stable current will now be presented.

The stable situation is determined by the balance of the average voltages at the first and second snubber nodes. Assuming a DC-DC converter operating in continuous conduction mode, the average voltage at a snubber capacitor can be calculated as:

$$\overline{V_{Cs}} = \frac{t_2}{T} \cdot V_{out} + \frac{t_1}{T} \cdot \left( V_{out} - \frac{I_{Ls}}{C_s} \cdot \frac{t_1}{2} \right) \tag{2}$$

$$t_1 = T \cdot \left( 2 - \frac{V_{in}}{V_{out}} \right) = T \cdot a \tag{3}$$

$$t_2 = T - t_1 = T \cdot (1 - a) \tag{4}$$

Hence:

$$\overline{V_{Cs}} = V_{out} - a^2 \cdot \frac{I_{Ls}}{C_s} \cdot \frac{T}{2} \tag{5}$$

This derivation assumes the faster transition by charging a load current is neglected. The average voltage at the nodes $C_{S1}/D_{S1}$ and $C_{S2}/D_{S2}$ are determined by equations 6 and 7

$$\overline{V_{Cs2}} = \overline{V_{Cs}} \tag{6}$$

$$\overline{V_{Cs1*}} = V_{in} - \overline{V_{Cs}} \tag{7}$$

Introducing the balance condition yields: equations 8 and 9:

$$\overline{V_{Cs2}} = \overline{V_{Cs1*}} \tag{8}$$

$$V_{in} - \overline{V_{Cs}} = \overline{V_{Cs}} \tag{9}$$

Hence, equations 10 and 11:

$$\overline{V_{Cs}} = \frac{V_{in}}{2} \tag{10}$$

$$\frac{V_{in}}{2} = V_{out} - a^2 \cdot \frac{I_{Ls}}{C_s} \cdot \frac{T}{2} \tag{11}$$

Eventually, the expression can be solved for the regenerative current $I_{LS}$: equation 12.

$$I_{Ls} = \frac{C_s(2V_{out} - V_{in})}{a^2 T} \tag{12}$$

$$= \frac{C_s V_{out}}{\frac{2V_{out} - V_{in}}{V_{out}} T} \tag{13}$$

$$= \frac{C_s \cdot V_{out}}{T \cdot a} \tag{14}$$

A necessary consequence of this magnitude of the current is that without considering extra losses, the voltage of the snubber capacitor reaches exactly 0 Volts when the power transistor is turned on again: see equations 16 and 17.

$$V_{Cs}(t_1) = V_{out} - t_1 \cdot \frac{I_{Ls}}{C_s} \tag{15}$$

$$= V_{out} - T \cdot a \cdot \frac{\frac{C_s \cdot V_{out}}{T \cdot a}}{C_s} = 0 \tag{16}$$

$$= V_{out} - T \cdot a \cdot \frac{C_s \cdot V_{out}}{C_s} = 0 \tag{17}$$

Therefore, a pre-conditioner circuit according to a first aspect of the invention has been described and explained.

Figure 9:
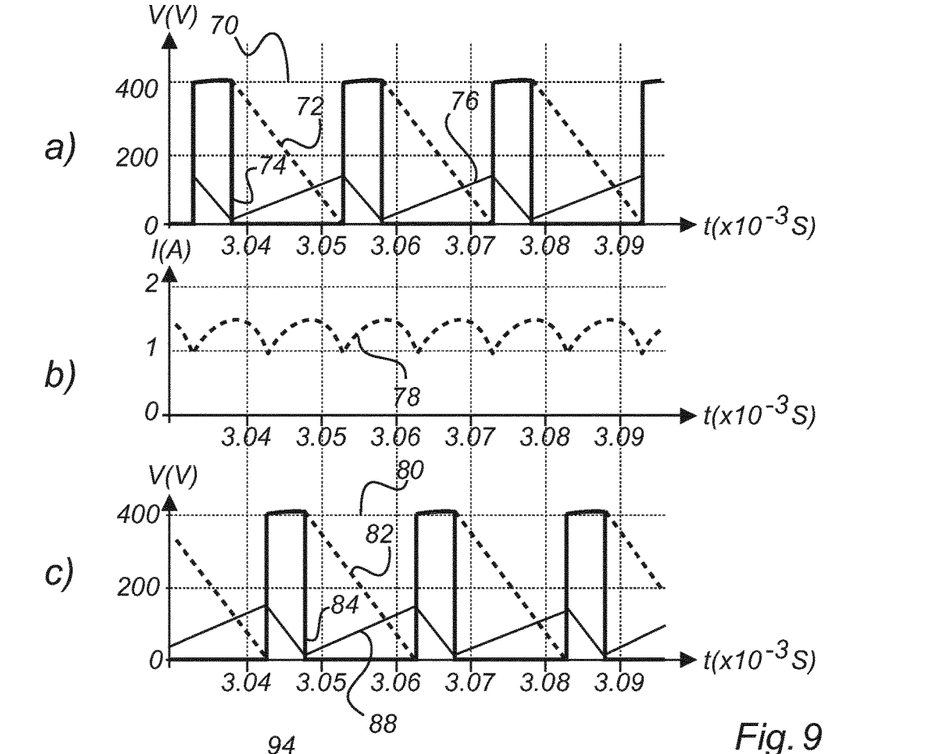
FIG. 9 shows further results for a pre-conditioner circuit according to a first aspect of the invention.

FIG. 9 illustrates further the operation of the circuit of FIG. 6. It will be appreciated that this performance can be generalized to the performance of the system shown in FIG. 5. In FIG. 9, a pre-conditioner circuit has been simulated with values of $R_{L1}$ and $R_{L2}$ of 4 Ohms, $L_1$ and $L_2$ of 12.5 µH, $L_S$ as 1 mH, $C_{o1}$ and $C_{o2}$ at 40 µF, and $C_{s1}$ and $C_{s2}$ at 47 nF. The control switching frequency was 50 kHz, and the voltage appearing across $V_i$ is 500V.

FIG. 9a) shows the performance of the first pre-conditioner module 36. FIG. 9b) shows the current in the energy recovery element 50 (inductor $L_S$). FIG. 9c) shows the performance of the second pre-conditioner circuit 38.

Turning to FIG. 9a), line 70 shows the output voltage of the first pre-conditioner module $V_{o1}$. Line 72 shows the voltage across the first snubber capacitor $C_{s1}$. 74 shows the voltage $V_{Q1}$. Line 76 shows the current in inductor $L_1$. The x-axis of FIG. 9a) shows the voltage (or current), against the timescale shown at the bottom of FIG. 9c) in seconds.

FIG. 9b) shows line 78 which represents the regenerative current in the energy recovery element 50 (inductor $L_S$). The x-axis of FIG. 9b) is in Amperes and the y-axis of FIG. 9b) uses the same timescale as that shown at the bottom of FIG. 9c). The value of the inductor Ls does not need to be tuned for every single frequency and therefore this concept works statically. Through Ls there is a substantial DC constant current during normal operation. Hence the discharge has a substantial DC content. In this topology one of the snubbers has always higher voltage than the other one, a (loss-less) element is used to use the extra charge of a second snubber to discharge the first snubber.

FIG. 9c) shows line 80 being the output voltage $V_{O2}$, line 82 which is the voltage across the second snubber capacitor $C_{s2}$, illustrated in FIG. 6 by arrow $V_{CS2}$, the line 84 is the voltage at switching node of the second power transistor $Q_2$, shown in FIG. 6 as voltage $V_{Q2}$, and line 88 shows the current in the second inductor $L_2$.

It is seen that the switching patterns of the first pre-conditioner module 36 and the second pre-conditioner module 38 are, in this example, at 180°. It will be appreciated by the skilled person, that the switching phases of the transistors $Q_1$ and $Q_2$ may be varied apart from 180° by the control circuit, whilst retaining the performance of the energy recovery element 50. It is seen that the current in the energy recovery element 50 (inductor $L_2$) tracks the control as the first and second pre-conditioner modules switch.

According to an embodiment of the invention, a pre-conditioner circuit as described previously is provided, wherein the first 36 and second 38 pre-conditioner modules comprise, respectively, first and second switches $Q_1$, $Q_2$ configured to be activated, and deactivated, alternately, wherein the pre-conditioner circuit further comprises a controller for controlling the duty cycle of the first and second switches.

According to an embodiment of the invention, the first and second switches $Q_1$ and $Q_2$ are MOSFETs. Alternatively, the first and second switches are IGFETs. It will be appreciated that many semiconductor devices can provide the required switching performance.

The controller may be a microcontroller, or a digital, or analogue control circuit.

According to an embodiment of the invention, a pre-conditioner circuit 30 is provided, as described previously, wherein the control circuit is arranged to switch the first switch in a phase-shifted pattern, relative to the second switch.

According to an embodiment of the invention, a pre-conditioner circuit 30 as described previously is provided, wherein the phase-shift of the phase-shifted pattern is 180 degrees.

According to an embodiment of the invention, a pre-conditioner circuit 30 is provided as described previously, wherein the first and/or second snubber circuits comprise a snubber capacitor $C_{s1}$, $C_{s2}$, and a snubber diode $D_{s1}$, $D_{s2}$ arranged in parallel with the first $Q_1$ and second $Q_2$ switches, respectively.

According to an embodiment of the invention, an energy recovery element 50 is provided which connects a first node of the first snubber circuit with a first node of the second snubber circuit, wherein the first nodes are, respectively, disposed at a junction of the respective snubber capacitor $C_{s1}$, $C_{s2}$ and snubber diode $D_{s1}$, $D_{s2}$ of the first and second snubber circuits.

The energy recovery element enables a regenerative current to flow between the first and second snubber circuits.

According to an embodiment of the invention, a pre-conditioner circuit 30 is provided as described above, wherein the energy recovery element 50 is an inductor $L_S$.

According to an embodiment of the invention, a pre-conditioner circuit 30 is provided as described previously, wherein the first 36 and second 38 pre-conditioner modules comprise step-down converters.

According to an aspect of the invention, a power supply module comprising a pre-conditioner circuit 30 according to any preceding claim is provided.

According to an aspect of the invention, an X-ray imaging system 90 is provided comprising a pre-conditioner circuit according to the previous description, wherein at least the first, and/or second load modules supply power to an X-ray tube.

Figure 10:
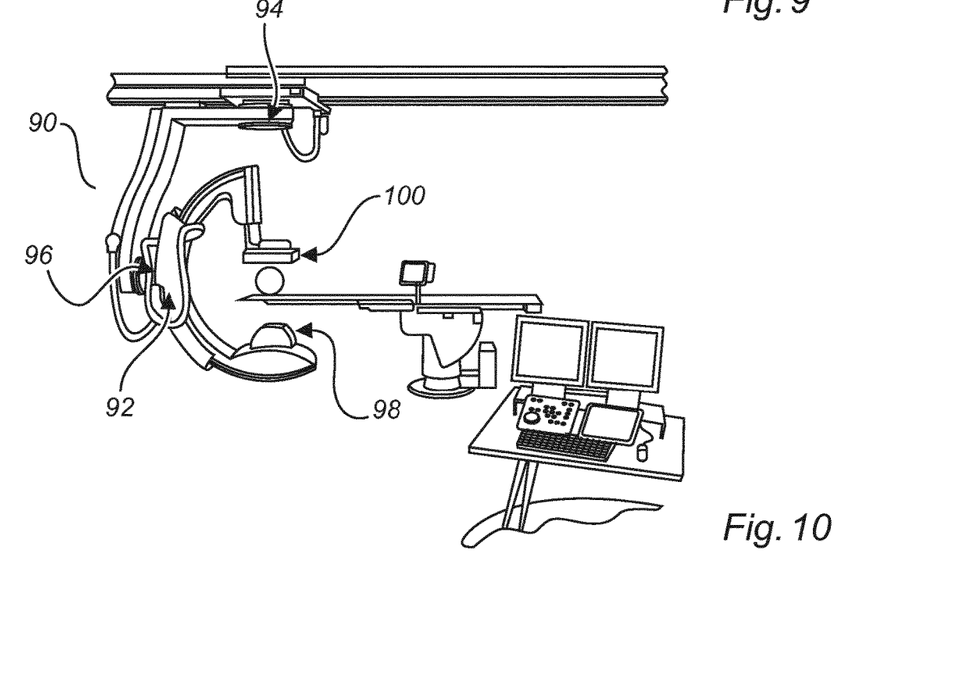
FIG. 10 shows an X-ray imaging system comprising a pre-conditioner circuit according to a second aspect of the invention.

FIG. 10 illustrates an X-ray imaging system. The X-ray imaging system 90 is in the form of a C-arm 92 which is connected by joints 94 and 96 to a ceiling of an X-ray examination suite. The C-arm 92 comprises an X-ray source 98 and an X-ray detector 100 positioned either side of an object of interest. The X-ray imaging system 90 is powered by a pre-conditioner circuit 30 as described previously.

The pre-conditioner has wide applicability for powering systems from utility power supplies.

According to an embodiment of the invention, the pre-conditioner circuit is used to power a CT scanner, a conventional X-ray system, or an MRI system.

According to an aspect of the invention, a lighting system comprising a pre-conditioner circuit as previously described is provided.

According to this aspect of the invention, the first and second load modules comprise first and second lighting ballast circuits.

According to an embodiment of the invention, a lighting system as described previously is provided, wherein the load comprises a first lighting ballast driven using the first pre-conditioner module and a second lighting ballast is driven using the second pre-conditioner module.

It should be noted that all features can be combined to provide a synergetic effect which is more than a simple summation of the features described herein.

While the invention has been illustrated and described in detail in the drawings and foregoing description, such illustration and description are to be considered illustrative or exemplary, and not restrictive. The invention is not limited to the disclosed embodiments.

Other variations to the disclosed embodiments can be understood, and effected by those skilled in the art in practicing the claimed invention, from a study of the drawings, the disclosure, and the dependent claims.

In the claims, the word "comprising" does not exclude other elements or steps, and the indefinite article "a" or "an" does not exclude a plurality. A single processor, or other unit, may fulfil the functions of several items recited in the claims. The mere fact that certain measures are recited in mutually different dependent claims does not indicate that a combination of these measures cannot be used to advantage. Any reference signs in the claims should not be construed as limiting the scope.

The invention claimed is:

1. A pre-conditioner circuit having input terminals for receiving an input voltage,
   wherein the pre-conditioner circuit is configured to modify the input voltage for application to a load module;
   wherein the pre-conditioner circuit comprises a first and a second pre-conditioner module each having an input and an output for connection to respective first and second load modules;
   wherein the output of the first pre-conditioner module is coupled in series with the input of the second pre-conditioner module, and the output of the second pre-conditioner module is coupled in series with the input of the first pre-conditioner module;
   wherein the first and second pre-conditioner modules comprise a first and second snubber circuit, respectively; and
   wherein the first and second snubber circuits are interconnected by an energy recovery element to enable a regular discharge of the first and second snubber circuits, wherein the energy recovery element connects a first node of the first snubber circuit with a first node of the second snubber circuit, each of the first nodes being disposed at a junction of a respective snubber capacitor and a respective snubber diode of the first and second snubber circuits, respectively.

2. The pre-conditioner circuit according to claim 1, wherein the first and second pre-conditioner modules comprise, respectively, first and second switches configured to be activated and deactivated alternately, and wherein the pre-conditioner circuit further comprises a controller for controlling a duty cycle of the first and second switches.

3. The pre-conditioner circuit according to claim 2, wherein the control circuit is arranged to switch the first switch in a phase-shifted pattern relative to the second switch.

4. The pre-conditioner circuit according to claim 3, wherein the phase shift of the phase shifted pattern is 180 degrees.

5. The pre-conditioner circuit according to claim 1, wherein the respective snubber capacitor and the respective snubber diode are arranged in parallel with the first and second switches, respectively.

6. The pre-conditioner circuit according to claim 1, wherein the energy recovery element is an inductor.

7. A power supply module comprising a pre-conditioner circuit having input terminals for receiving an input voltage,
   wherein the pre-conditioner circuit is configured to modify the input voltage for application to a load module;
   wherein the pre-conditioner circuit comprises a first and a second pre-conditioner module each having an input and an output for connection to respective first and second load modules;
   wherein the output of the first pre-conditioner module is coupled in series with the input of the second pre-conditioner module, and the output of the second pre-conditioner module is coupled in series with the input of the first pre-conditioner module;
   wherein the first and second pre-conditioner modules comprise a first and second snubber circuit, respectively; and
   wherein the first and second snubber circuits are interconnected by an energy recovery element to enable a regular discharge of the first and second snubber circuits, wherein the energy recovery element connects a first node of the first snubber circuit with a first node of the second snubber circuit, each of the first nodes being disposed at a junction of a respective snubber capacitor and a respective snubber diode of the first and second snubber circuits, respectively.

8. An X-ray imaging system comprising a pre-conditioner circuit having input terminals for receiving an input voltage,
   wherein the pre-conditioner circuit is configured to modify the input voltage for application to a load module;
   wherein the pre-conditioner circuit comprises a first and a second pre-conditioner module each having an input and an output for connection to respective first and second load modules;
   wherein the output of the first pre-conditioner module is coupled in series with the input of the second pre-conditioner module, and the output of the second pre-conditioner module is coupled in series with the input of the first pre-conditioner module;
   wherein the first and second pre-conditioner modules comprise a first and second snubber circuit, respectively; and
   wherein the first and second snubber circuits are interconnected by an energy recovery element to enable a regular discharge of the first and second snubber circuits, wherein the energy recovery element connects a first node of the first snubber circuit with a first node of the second snubber circuit, each of the first nodes being disposed at a junction of a respective snubber capacitor and a respective snubber diode of the first and second snubber circuits, respectively, wherein the load module comprises an X-ray tube.

9. A lighting system comprising a pre-conditioner circuit having input terminals for receiving an input voltage,
   wherein the pre-conditioner circuit is configured to modify the input voltage for application to a load module;
   wherein the pre-conditioner circuit comprises a first and a second pre-conditioner module each having an input and an output for connection to respective first and second load modules;
   wherein the output of the first pre-conditioner module is coupled in series with the input of the second pre-conditioner module, and the output of the second pre-conditioner module is coupled in series with the input of the first pre-conditioner module;
   wherein the first and second pre-conditioner modules comprise a first and second snubber circuit, respectively; and
   wherein the first and second snubber circuits are interconnected by an energy recovery element to enable a regular discharge of the first and second snubber circuits, wherein the energy recovery element connects a first node of the first snubber circuit with a first node of the second snubber circuit, each of the first nodes being disposed at a junction of a respective snubber capacitor and a respective snubber diode of the first and second snubber circuits, respectively.

10. The lighting system of claim 9,
    wherein the load module comprises a first lighting ballast driven using the first pre-conditioner module and a second lighting ballast driven using the second pre-conditioner module.

* * * * *